United States Patent [19]
Kawachi et al.

[11] Patent Number: 5,632,167
[45] Date of Patent: May 27, 1997

[54] STEERING LOOK APPARATUS

[75] Inventors: Tomonori Kawachi; Nobuyoshi Yasuhara, both of Aichi, Japan

[73] Assignee: Kabushiki Kaisha Tokai Rika Denki Seisakusho, Aichi, Japan

[21] Appl. No.: 538,698

[22] Filed: Oct. 3, 1995

[30] Foreign Application Priority Data

Oct. 6, 1994 [JP] Japan .................. 6-242670

[51] Int. Cl.⁶ .................................. B60R 25/02
[52] U.S. Cl. ..................... 70/186; 70/65; 70/252
[58] Field of Search ................ 70/252, 182–186, 70/422, 1.5, 1.7, 237; 180/287

[56] References Cited

U.S. PATENT DOCUMENTS

| | | | |
|---|---|---|---|
| 3,828,594 | 8/1974 | Yamamoto | 70/252 |
| 4,333,325 | 6/1982 | Morikawa et al. | 70/252 X |
| 4,771,619 | 9/1988 | Shiramizu et al. | 70/252 X |
| 4,884,423 | 12/1989 | Fancher | 70/252 X |
| 5,271,252 | 12/1993 | Yasuhara et al. | 70/252 X |

FOREIGN PATENT DOCUMENTS

| | | | |
|---|---|---|---|
| 2590533 | 5/1987 | France | 70/252 |
| 4134773 | 12/1992 | Japan . | |

*Primary Examiner*—Lloyd A. Gall
*Attorney, Agent, or Firm*—Finnegan, Henderson, Farabow, Garrett & Dunner, L.L.P.

[57] ABSTRACT

When a key cylinder is caused to come off a body, a regulating lever moves. As a result of such movement, a block member moves to engage with an engagement groove of an engagement body, so that the rotation of a cam shaft can be blocked. In addition, a lock piece enters between the block member and a cover. Even if the regulating lever is broken, the rotation of the cam shaft is blocked by the block member, and even if one attempts to move the block member in a disengagement direction, the movement of the block member is blocked by the lock piece.

4 Claims, 5 Drawing Sheets

STEERING LOCK APPARATUS

BACKGROUND OF THE INVENTION

1. Field of the Invention

This invention relates to a steering lock apparatus that locks a steering shaft and hence a steering wheel with a key rotor of a key cylinder rotated to a lock position.

2. Background

In a steering lock apparatus for motor vehicles in general, the rotation of the steering shaft and hence the steering wheel can be locked by rotating the key rotor of the key cylinder to the "LOCK" position, which is a locking position, with a key and by engaging a lock bar with the steering shaft side when the key is taken out of the key rotor.

When the key is inserted into the key rotor and the key rotor is then rotated to the operating positions ("ACC", "ON", "START" positions), a cam projection of the cam shaft that integrally rotates with the key rotor moves the lock bar to disengage the lock bar from the steering shaft side, so that the steering shaft and hence the steering wheel can be unlocked. Further, as the cam shaft rotates, an ignition switch is also operated.

Therefore, the steering lock apparatus of this type is an effective burglarproof device, because the steering lock apparatus can not operate the steering wheel and the ignition switch when there is not the key.

However, in such steering lock apparatus, when the key cylinder is caused to come off the body by some device or as a result of the front portion of the body having been broken with the steering shaft having been locked, the cam shaft is exposed within the body, and this condition leaves the cam shaft rotatable.

To overcome this problem, the inventors filed Japanese Utility Model Application No. Hei. 3-51917 (Unexamined Japanese Utility Model Publication No. Hei. 4-134773).

The apparatus disclosed in the aforementioned utility model publication is characterized not only as arranging an engagement body having an engagement groove so as to rotate integrally with the cam shaft, but also as arranging a block member in the body so as to be movable between an engagement position and a disengagement position, and further as arranging a regulating member that engages with the block member when the block member moves to the engagement position.

In this apparatus, the block member is held in the disengagement position while biased by the key cylinder under the normal condition in which the key cylinder is accommodated in the body. When the key cylinder is caused to come off the body by some device with the steering shaft having been locked, the block member moves to the engagement position by an urging force of an urging device to engage with the engagement groove of the engagement body. As a result of such engagement of the block member, the rotation of the engagement body and hence the cam shaft can be blocked.

SUMMARY OF THE INVENTION

The object of the present invention is to provide a steering lock apparatus that is capable of blocking the rotation of the cam shaft more effectively in a steering lock apparatus that blocks the rotation of the cam shaft within the body when the key cylinder is caused to come off the body or the key cylinder side of the body is broken.

To achieve the above object, the present invention is applied to a steering lock apparatus that includes: a body mounted on a motor vehicle; a cam shaft having a cam projection on an outer circumferential portion thereof and being rotatably arranged within the body; a key cylinder having a key rotor that is rotated by a key, the key cylinder being accommodated in a front portion of the body and being coupled to the cam shaft so that the key rotor rotates integrally with the cam shaft while accommodated in the body; a lock member being arranged so as to be moved by the cam projection as a result of the rotation of the cam shaft and locking a steering shaft with the key rotor having been rotated to a lock position; an engagement body having an engagement groove and being arranged so as to rotate integrally with the cam shaft; a regulating lever being arranged in the body so as to be movable in axial directions, being urged towards the key cylinder by an urging device, being moved to a regulation position while biased by the key cylinder as a result of the key cylinder being accommodated in the body, and being moved to a regulation release position as a result of the key cylinder being taken out of the body; a block member being movably arranged in the body, being urged by an urging device in such a direction as to engage with the engagement groove, being held in a disengagement position with the regulating lever having been moved to the regulation position, the disengagement position being a position at which the engagement of the block member with the engagement groove by the regulating lever is released, and being moved to an engagement position as a result of the regulating lever moving to the regulation release position with the cam shaft having been rotated to the lock position, so that the rotation of the engagement body can be blocked, the engagement position being a position at which the block member engages with the engagement groove; and a lock piece being movably arranged in the body, and moving to the lock position by an urging force of an urging device as a result of the block member moving to the engagement position, so that movement of the block member towards the disengagement position can be blocked.

If the key cylinder is caused to come off the body after the key rotor of the key cylinder has been rotated to the lock position and the key has been taken out of the body, i.e., after the steering shaft has been locked, then the regulating lever biased by the key cylinder moves to the regulation release position from the regulation position, and simultaneously therewith the block member engages with the engagement groove of the engagement body by moving from the disengagement position to the engagement position. As a result of this engagement of the block member, the rotation of the engagement body and hence the cam shaft can be blocked. Therefore, the steering shaft in the locked condition cannot be unlocked. Further, at this instance, as the block member moves to the engagement position, the lock piece moves to the lock position, thereby blocking the block member from moving to the disengagement position.

In this case, even if the regulating lever is broken with the key cylinder having been removed, the rotation of the cam shaft remains blocked by the block member. Therefore, the blocking of the rotation of the cam shaft is effective. In addition, since the movement of the block member to the disengagement position is blocked by the lock piece, the block member does not move even if attempts are made to move the block member to the disengagement position by some means. Therefore, the rotation of the cam shaft can be blocked further effectively.

DETAILED DESCRIPTION OF THE PREFERRED EMBODIMENT

Figure 1:
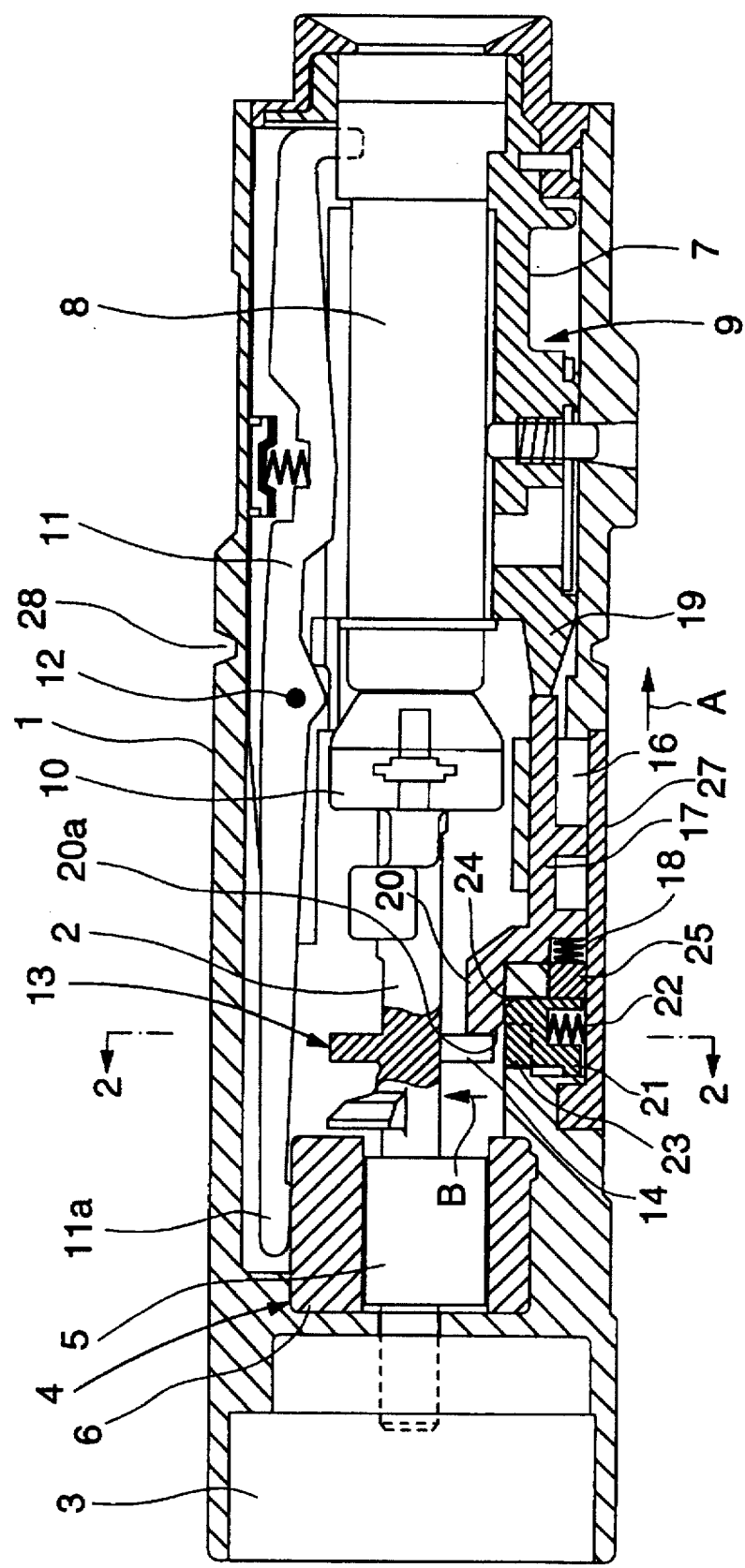
FIG. 1 is a longitudinal sectional side view showing an embodiment of the present invention.
Figure 2:
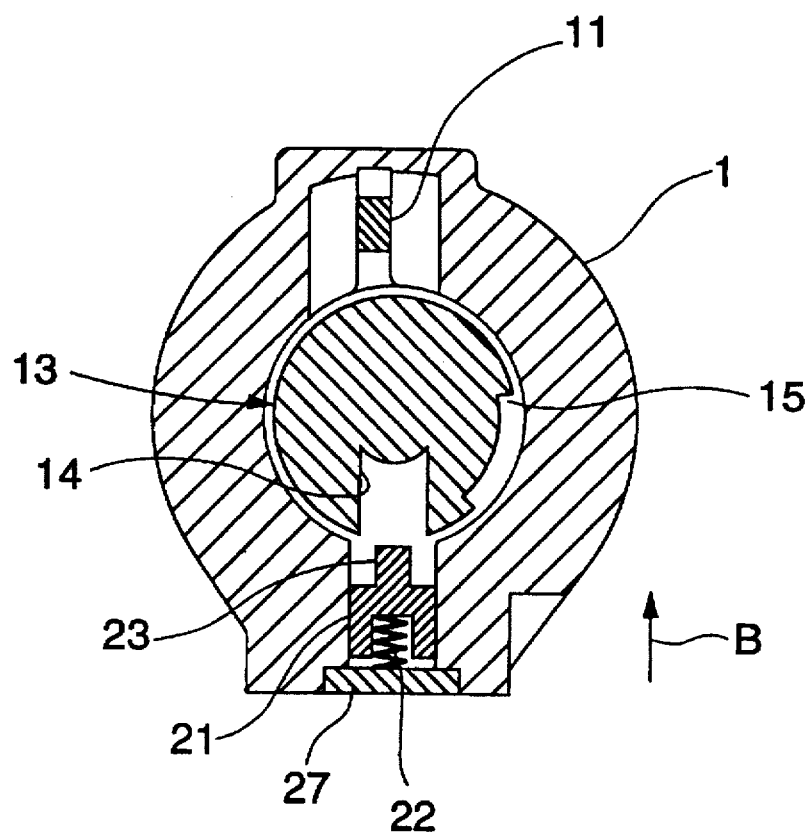
FIG. 2 is a longitudinal sectional front view taken along a line 2—2 of FIG. 1.

An embodiment of the invention will now be described with reference to the drawings. In FIGS. 1 and 2 that show an assembled state of the embodiment, a body 1 is hollow and is designed to be attached close to a steering shaft of a not shown motor vehicle.

A cam shaft 2 is rotatably arranged deep into the body 1. An ignition switch 3 is provided in the rear end portion (the left end as viewed in FIG. 1) of the cam shaft 2, the ignition switch being operated as the cam shaft 2 rotates.

A cam projection 5 is arranged on the rear circumference of the cam shaft 2 so that a lock member 4 can be moved as the cam shaft 2 rotates. The lock member 4, having a frame body 6 and a lock bar (not shown), is known. That is, the frame body 6 is arranged so as to surround the cam projection 5 and is moved by the cam projection 5. The lock bar is such that one end thereof is coupled to the frame body 6. The other end of the lock bar is urged by a not shown spring in such a direction as to engage with a collar of the steering shaft.

A key cylinder 9 is unreleasably accommodated within a cylinder case 7 on the side of an opening in the front of the body 1. The key cylinder 9 has a key rotor 8 that is rotated by a key (not shown). The key cylinder 9 allows the key to be inserted into and uninserted from a key hole of the key rotor 8 only with the key rotor 8 having been rotated to a "LOCK" position, which is a locking position. Further, the rear end portion of the key rotor 8 is designed to be coupled to a coupling portion 10 in the front of the cam shaft 2 by engagement with the key cylinder 9 having been accommodated in the body 1, so that both the key rotor 8 and the cam shaft 2 can be rotated integrally with each other.

A locking lever 11 is arranged on the outer circumference of the cylinder case 7 so as to be rotatable about a shaft 12. This locking lever 11 is, as known well, designed in such a manner that a rear end portion 11a engages with the frame body 6 to hold the lock member 4 in a disengagement position with the key rotor 8 having been rotated to "ACC", "ON", and "START" positions, which are the key rotor's operating positions, and that the engagement of the rear end portion 11a with the frame body 6 is released as the key rotor 8 is being rotated to the "LOCK" position.

An engagement body 13 is arranged integrally on an outer circumferential portion of the cam shaft 2, the outer circumferential portion being in the middle of the cam shaft 2 as viewed in the axial direction. As shown in FIG. 2, the engagement body 13 has an engagement groove 14 and an auxiliary engagement groove 15. The engagement groove 14 has openings on a circumferential portion and both ends in the axial direction. The auxiliary engagement groove 15 is shallower and wider than the engagement groove 14.

A guide portion 16 is arranged at a predetermined position in the body 1. A regulating lever 17 is arranged so as to be movable along the length of the cam shaft 2 while guided by such guide portion 16. This regulating lever 17 is urged by a spring 18 serving as an urging device towards the key cylinder 9 (in a direction indicated by an arrow A shown in FIG. 1). The regulating lever 17 is moved to a regulation release position shown in FIG. 4 before the key cylinder 9 is accommodated in the body 1. As the key cylinder 9 is being inserted into the body 1, the regulating lever 17 is biased by a projection 19 formed on the rear end portion of the cylinder case 7, so that the regulating lever 17 is moved to a regulation position shown in FIG. 1 and held therein. A cam portion 20 having a slope 20a is formed on the rear end portion of the regulating lever 17.

Further, in the body 1, a block member 21 is arranged at a position confronting the engagement body 13 so as to be movable in a radial direction of the engagement body 13. The block member 21 is urged by a spring 22 serving as an urging device towards the engagement body 13 (in a direction indicated by an arrow B). The block member 21 has an engagement projection 23 formed so as to confront the engagement body 13 and a slope 24 formed on the front side. The block member 21 is held in a disengagement position with the regulating lever 17 having been moved to the regulation position as shown in FIG. 1, the disengagement position being a position where the block member 21 is moved away from the engagement body 13 while biased by the cam portion 20.

Figure 3:
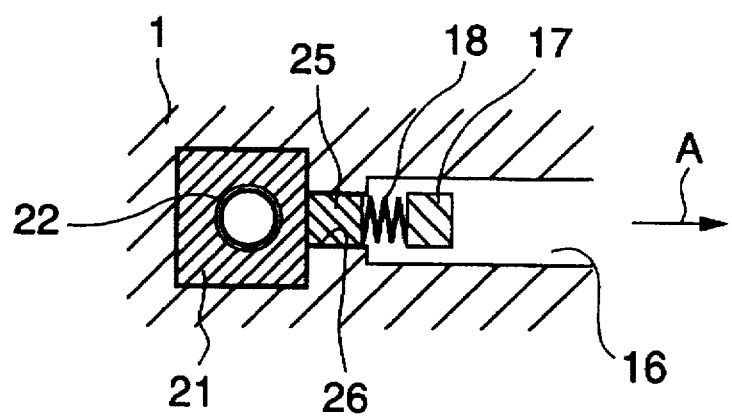
FIG. 3 is a transverse sectional view of a lock piece.

In the body 1, a lock piece 25 is arranged so as to be interposed between the block member 21 and the spring 18. As shown in FIG. 3, the lock piece 25 is allowed to move in the same directions as the regulating lever 17 along a guide groove 26 formed in the body 1. With the block member 21 having been set to the disengagement position, the lock piece 25 is abutted against the front surface of the block member 21 (the surface on the right as viewed in FIG. 1).

A cover 27 is put over the outer surface of the body 1, covering the regulating lever 17, the block member 21, the lock piece 25, and the springs 18, 22 from outside. Further, a groove 28 is formed at a position adjacent to the rear end portion of the key cylinder 9 in an outer circumferential portion of the body 1. The groove 28 is formed in order to help the body 1 break easily at such position, should the body 1 be subject to breakage. That is, the groove 28 prevents the steering lock function of the lock member 4 from being lost by causing the body 1 to be broken at the groove 28.

The operation of the above apparatus will be described next. The case of assembling the apparatus will be described first. For assembling the apparatus, the key cylinder 9 is set into the body 1 as the last assembling component; the key cylinder 9 is set into the body 1 with the cam shaft 2 having been rotated to a position corresponding to the "ACC" position out of the cam shaft operating positions.

Figure 4:
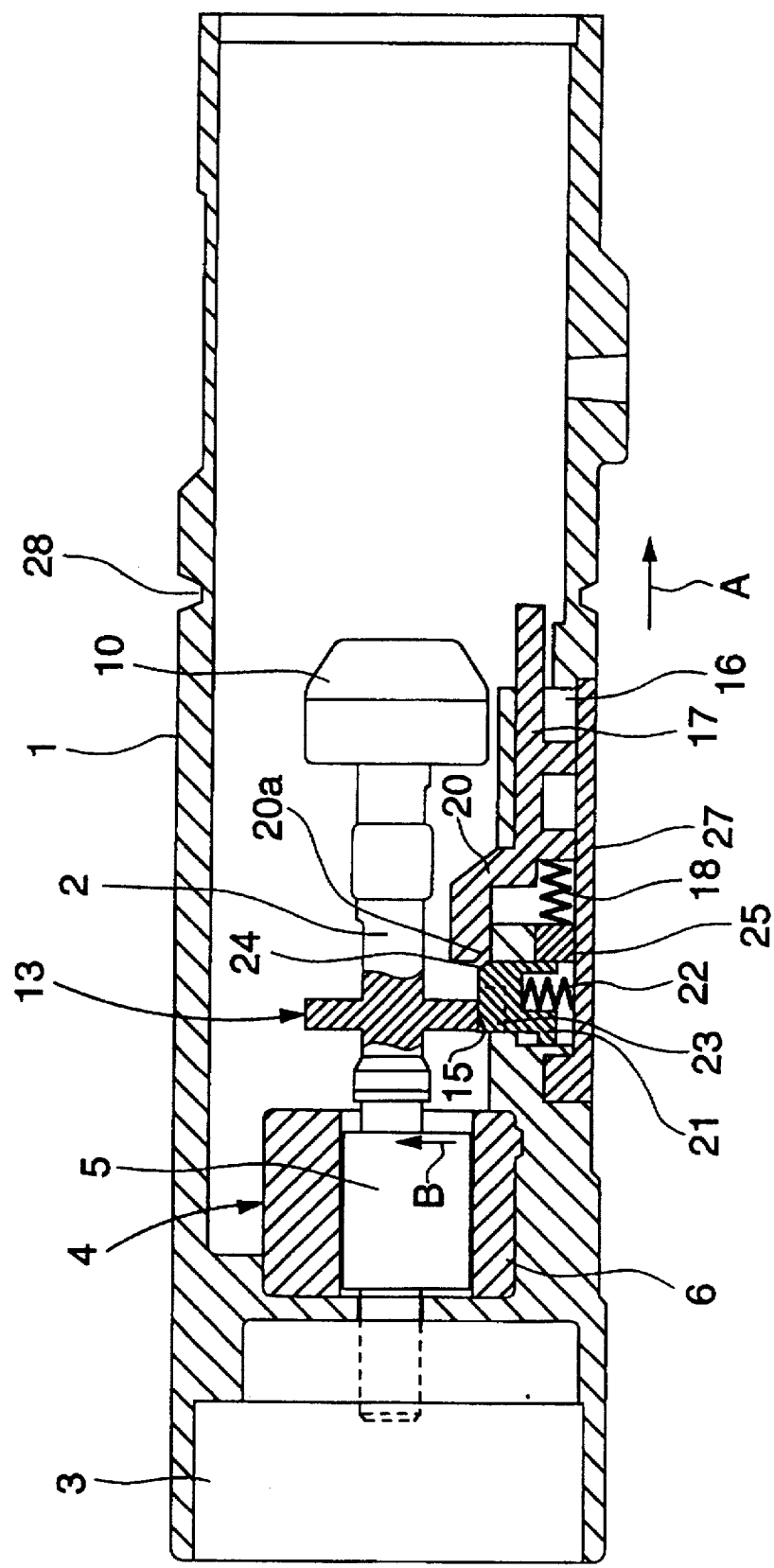
FIG. 4 is a diagram equivalent of FIG. 1 showing a state before a key cylinder is inserted into a body.
Figure 5:
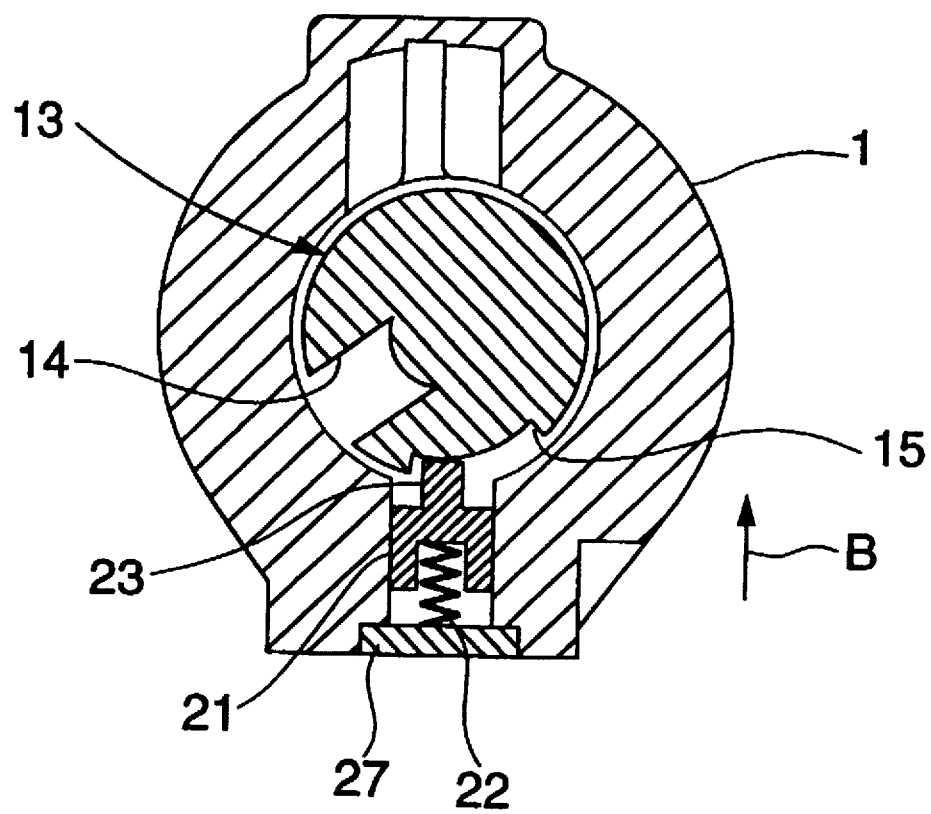
FIG. 5 is a diagram equivalent of FIG. 2 showing the same state as in FIG. 4.

As shown in FIG. 4, the regulating lever 17 is moved to the regulation release position with the key cylinder 9 not set into the body 1 and with the cam shaft 2 rotated to the position corresponding to the "ACC" position. Further, as shown in FIG. 5, the auxiliary engagement groove 15 of the engagement body 13 confronts the engagement projection 23 of the block member 21, i.e., the engagement projection 23 is inserted into the auxiliary engagement groove 15. At the same time, the slope 20a of the cam portion 20 in the regulating lever 17 confronts the slope 24 of the block member 21 (see FIG. 4). Further, the lock piece 25 is abutted against the front surface of the block member 21.

It may be noted that the auxiliary engagement groove 15 has such a range as to allow the cam shaft 2 to rotate from the "ACC" position to the "ON" position with the engagement projection 23 having been inserted into the auxiliary engagement groove 15.

When the key cylinder 9 is inserted into the body 1 to be accommodated therein under this condition, not only the rear end portion of the key rotor 8 comes in engagement with the coupling portion 10 of the cam shaft 2 to be coupled thereto as shown in FIG. 1, but also the regulating lever 17 is biased by the projection 19 of the cylinder case 7, so that the regulating lever 17 is moved in the direction opposite to the arrow A, resisting the urging force of the spring 18. As the regulating lever 17 is moving in the direction opposite to the arrow A, the slope 24 of the block member 21 is pushed by the slope 20a of the cam portion 20, causing the block member 21 to move in the direction opposite to the arrow B, resisting the urging force of the spring 22. It may be noted that FIGS. 1 and 2 show a condition in which the cam shaft 2 has been rotated to a position corresponding to the "LOCK" position.

When the regulating lever 17 reaches the regulation position shown in FIG. 1, the block member 21 is held in the disengagement position by the cam portion 20 of the regulating lever 17. Under this condition, the engagement projection 23 of the block member 21 is away from the engagement body 13.

In the condition shown in FIGS. 1 and 2, there is no possibility that the rotation of the engagement body 13 will be blocked by the block member 21. Therefore, the cam shaft 2 and hence the key rotor 8 of the key cylinder 9 can be freely rotated by the key within the range from the "LOCK" position to the "START" position. The steering lock apparatus is usually used under this condition shown in FIGS. 1 and 2.

In the condition shown in FIGS. 1 and 2, if the key rotor 8 is rotated by the key, then the cam shaft 2 is rotated integrally therewith. As a result, not only the ignition switch 3 is operated but also the lock member 4 is moved by the cam projection 5. When the key rotor 8 is rotated to the "LOCK" position and then the key is pulled out of the key rotor 8, the lock bar of the lock member 4 comes in engagement with the steering shaft side, thereby locking the rotation of the steering shaft and hence the steering wheel.

Figure 6:
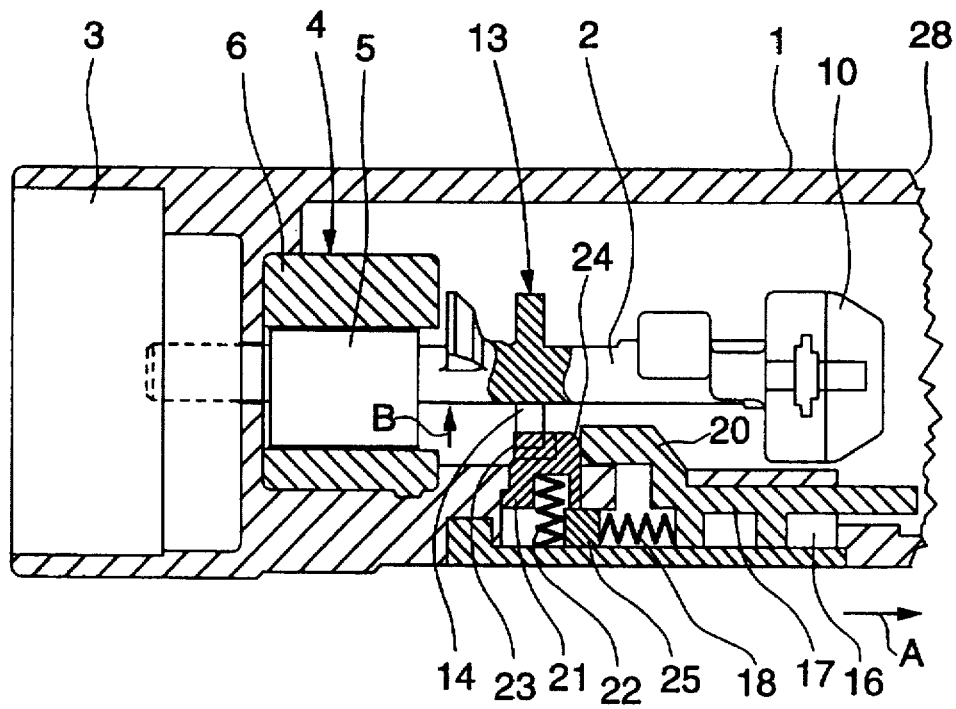
FIG. 6 is a longitudinal sectional side view showing a main portion with the body broken and the key cylinder removed.

Therefore, if the key cylinder 9 is caused to come off the body 1 or if the body 1 is broken at the groove 28 with the key having been taken out of the key rotor 8 (the key rotor 8 is set to the "LOCK" position), then the regulating lever 17, released from the pushing force of the projection 19, is moved in the direction of the arrow A by the urging force of the spring 18 to thereby reach the regulation release position as shown in FIG. 6.

Figure 7:
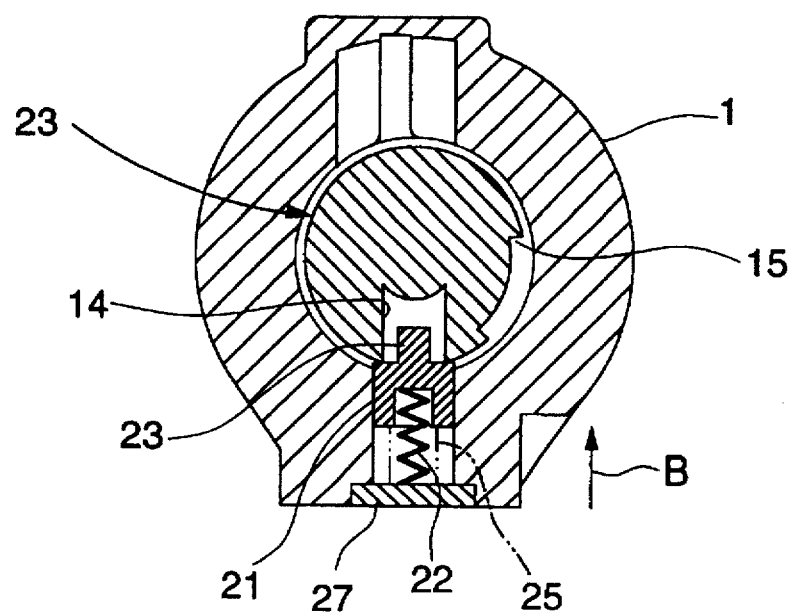
FIG. 7 is a diagram equivalent of FIG. 2 showing the same state as in FIG. 6.

When the regulating lever 17 has moved to the regulation release position in this way, the block member 21, released from the regulation by the cam portion 20, is moved in the direction of the arrow B by the urging force of the spring 22 to thereby reach the engagement position at which the engagement projection 23 engages with the engagement groove 14 of the engagement body 13 as shown in FIGS. 6 and 7. Further, when the block member 21 has reached the engagement position in this way, the lock piece 25 is moved to the direction opposite to the arrow A (rearward) by the urging force of the spring 18 to thereby enter between the block member 21 and the cover 27.

Under this condition, the rotation of the cam shaft 2 is blocked by the block member 21 engaging with the engagement groove 14. Therefore, the cam shaft 2 cannot be rotated even if attempts are made to rotate the cam shaft 2 with a tool or the like.

In addition, even if the regulating lever 17 is broken under this condition, the rotation of the cam shaft 2 remains blocked by the block member 21. Therefore, the rotation of the cam shaft 2 can be blocked effectively.

Moreover, the movement of the block member 21 towards the disengagement position is blocked by the lock piece 25 in this case. Therefore, even if attempts are made to move the block member 21 towards the disengagement position by some device, e.g., by inserting a slender plate or the like into a gap between the cover 27 and the body 1, the block member 21 does not move. In this case, in particular, the lock piece 25 is surrounded by the cover 27, the body 1, the block member 21, and the regulating lever 17, so that the lock piece 25 cannot even be touched from outside. Hence, the cam shaft 2 cannot be rotated unless the block member 21 is moved by removing the cover 27.

By the way, if the key cylinder 9 happens to come off the body 1 for some reason with the key rotor 8 having been set to the "ON" position (e.g., during the travelling of the motor vehicle) and, in addition, the cam shaft 2 happens to be rotated to the "LOCK" position in an apparatus like this, then it is conceivable that the steering shaft and hence the steering wheel come to be locked by the lock member 4.

In the case of this embodiment, the auxiliary engagement groove 15 of the engagement body 13 is designed to confront the engagement projection 23 of the block member 21 with the key rotor 8 and the cam shaft 2 having been set to the "ON" position. Therefore, if the key cylinder 9 comes off under this condition, the engagement projection 23 of the block member 21 comes in engagement with the auxiliary engagement groove 15 of the engagement body 13 (see FIGS. 4 and 5). Since this blocks the engagement body 13 and hence the cam shaft 2 from being rotated to the "LOCK" position by the block member 21, the locking of the steering shaft and hence the sheering wheel can be prevented during the travelling of the motor vehicle.

According to the aforementioned embodiment, even if the regulating lever 17 is broken with the key cylinder 9 having been released from the body 1, the rotation of the cam shaft 2 remains blocked by the block member 21. Therefore, the rotation of the cam shaft 2 can be blocked effectively. In addition, since the movement of the block member 21 towards the disengagement position is blocked by the lock piece 25, the block member 21 does not move even if one attempts to move the block member 21 towards the disengagement position by some device. Therefore, the rotation of the cam shaft 2 can be blocked more effectively.

As is apparent from the foregoing, the invention is characterized as allowing the rotation of the cam shaft to remain blocked by the block member even if the regulating lever is broken with the key cylinder having been released from the body. Therefore, the rotation of the cam shaft can be blocked effectively. In addition, the movement of the block member towards the disengagement position is blocked by the lock piece. Therefore, even if one attempts to move the block member towards the disengagement position by some device, the block member does not move. Hence, the rotation of the cam shaft can be blocked more effectively.

What is claimed is:

1. A steering lock apparatus, comprising:
 a body for mounting on a motor vehicle;
 a cam shaft having a cam projection on an outer circumferential portion thereof and being rotatably disposed within the body;

a key cylinder with a key insertion end and a rear end, said key cylinder having a key rotor being rotated by a key, the key cylinder being accommodated in a front portion of the body and being coupled to the cam shaft so that the key rotor integrally rotates with the cam shaft;

a lock member arranged so as to be moved by the cam projection, for locking a steering shaft when the key rotor is rotated to a lock position;

an engagement body integrally formed on the cam shaft, and having an engagement groove;

a first urging member;

a regulating lever movably disposed in axial directions in the body, and being urged towards the rear end of the key cylinder by the first urging member;

a second urging member;

a block member movably disposed in the body, being urged by the second urging member in such a direction as to engage with the engagement groove, and being regulated by the regulating lever; and a lock piece movably disposed in the body to lock the block member.

2. The steering lock apparatus of claim 1, wherein when the key cylinder is accommodated in the body, the regulation lever is moved to a regulation position by the key cylinder pressing the regulation lever, and the regulation lever being moved to a regulation release position by the key cylinder being taken out of the body.

3. The steering lock apparatus of claim 2, wherein the block member is held in the disengagement position at which the engagement of the block member with the engagement groove by the regulating lever is released, by the regulating lever being moved to the regulation position, and being moved to the engagement position at which the block member engages with the engagement groove, by the regulating lever moving to the regulation release position with the cam shaft being rotated to the lock position, so that the rotation of the engagement body is blocked.

4. The steering lock apparatus of claim 3, wherein the lock piece is moved to lock the block member engaged with the engagement groove by the first urging member when the block member is not held by the regulating lever.

* * * * *

UNITED STATES PATENT AND TRADEMARK OFFICE
CERTIFICATE OF CORRECTION

PATENT NO. : 5,632,167
DATED : May 27, 1997
INVENTOR(S) : Tomonori KAWACHI et al.

It is certified that error appears in the above-indentified patent and that said Letters Patent is hereby corrected as shown below:

Title page. Item [54], in the Title, line 1, "LOOK" should read --LOCK--.

Column 1, line 1, "LOOK" should read --LOCK--.

Signed and Sealed this

Twenty-third Day of September, 1997

*Attest:*

BRUCE LEHMAN

*Attesting Officer*     *Commissioner of Patents and Trademarks*